United States Patent
Nakabayashi et al.

(10) Patent No.: US 11,227,007 B2
(45) Date of Patent: Jan. 18, 2022

(54) SYSTEM, METHOD, AND COMPUTER-READABLE MEDIUM FOR MANAGING IMAGE

(71) Applicant: OBAYASHI CORPORATION, Tokyo (JP)

(72) Inventors: Takuma Nakabayashi, Tokyo (JP); Tomoya Kaneko, Tokyo (JP); Masashi Suzuki, Tokyo (JP)

(73) Assignee: OBAYASHI CORPORATION, Tokyo (JP)

( * ) Notice: Subject to any disclaimer, the term of this patent is extended or adjusted under 35 U.S.C. 154(b) by 33 days.

(21) Appl. No.: 16/519,848

(22) Filed: Jul. 23, 2019

(65) Prior Publication Data

US 2021/0026881 A1   Jan. 28, 2021

(51) Int. Cl.
*G06F 16/51* (2019.01)
*G06T 7/73* (2017.01)
(Continued)

(52) U.S. Cl.
CPC .............. *G06F 16/51* (2019.01); *G06F 16/55* (2019.01); *G06F 16/583* (2019.01); *G06K 9/00671* (2013.01); *G06T 7/73* (2017.01)

(58) Field of Classification Search
CPC ........ G06F 16/51; G06F 16/55; G06F 16/583; G06F 16/538; G06F 16/5866;
(Continued)

(56) References Cited

U.S. PATENT DOCUMENTS

2005/0104956 A1* 5/2005 Ono ................. G08B 13/19671
348/61
2005/0231357 A1* 10/2005 Kanayama ............... H04N 7/18
340/539.13

(Continued)

FOREIGN PATENT DOCUMENTS

JP     2002-218433 A    8/2002
JP     2005-276004 A    10/2005
(Continued)

OTHER PUBLICATIONS

JP Office Action in Application No. 2017-007862 dated Sep. 23, 2020.
(Continued)

*Primary Examiner* — Michael S Osinski
(74) *Attorney, Agent, or Firm* — Maschoff Brennan

(57) ABSTRACT

A system for managing images obtains an image that is captured by an image capture device at an image capture position and an image capture time; and stores the image, the image capture position, and the image capture time. The system further determines a position of a subject included in the image based on the image capture position. The system further stores index information comprising a target identifier of the subject, the position of the subject, and the image capture time in association with the stored image. The system further determines index information corresponding to the search instruction when obtaining a search instruction of the image; and extracts the image corresponding to the determined index information.

15 Claims, 5 Drawing Sheets

(51) Int. Cl.
*G06F 16/55* (2019.01)
*G06F 16/583* (2019.01)
*G06K 9/00* (2006.01)

(58) Field of Classification Search
CPC . G06F 16/587; G06T 7/73; G06T 7/70; G06T 19/006; G06K 9/00671; G06K 9/00677; G06K 9/00691; G06K 9/00744; G06K 9/00771; G06K 9/00288; G06K 9/00664; G06K 9/00201; G06K 9/00228; G06K 9/46; G06K 9/4628; G06K 9/6215; G06K 9/6256; G06K 9/6273
See application file for complete search history.

(56) References Cited

U.S. PATENT DOCUMENTS

| | | | |
|---|---|---|---|
| 2006/0028558 A1* | 2/2006 | Sato | H04N 5/232945 |
| | | | 348/211.99 |
| 2010/0149399 A1 | 6/2010 | Mukai et al. | |
| 2014/0015987 A1* | 1/2014 | Harple | G06F 21/84 |
| | | | 348/207.1 |
| 2014/0022372 A1 | 1/2014 | Martensson et al. | |
| 2014/0079341 A1* | 3/2014 | Ishigami | G06T 5/005 |
| | | | 382/309 |
| 2014/0160248 A1* | 6/2014 | Pomerantz | H04N 5/23212 |
| | | | 348/47 |
| 2014/0267799 A1* | 9/2014 | Sadasivam | H04N 5/23245 |
| | | | 348/207.99 |
| 2015/0312467 A1* | 10/2015 | Lee | H04W 68/00 |
| | | | 348/211.2 |
| 2016/0048930 A1* | 2/2016 | Sugiyama | G09G 5/12 |
| | | | 705/32 |
| 2016/0192009 A1 | 6/2016 | Sugio et al. | |
| 2016/0323515 A1* | 11/2016 | Inoue | H04N 21/42202 |
| 2017/0018044 A1* | 1/2017 | James | G06F 16/583 |
| 2017/0332050 A1* | 11/2017 | Yamashita | H04L 63/108 |
| 2018/0338109 A1* | 11/2018 | Badr | H04N 1/2187 |
| 2019/0005719 A1* | 1/2019 | Fleischman | G06T 19/003 |
| 2019/0180105 A1* | 6/2019 | Sasson | G06K 9/00637 |
| 2019/0370992 A1* | 12/2019 | Takami | H04N 21/44008 |
| 2019/0370998 A1* | 12/2019 | Ciecko | G01C 21/206 |
| 2019/0378192 A1* | 12/2019 | Fox | G06Q 30/0635 |
| 2019/0392212 A1* | 12/2019 | Sawhney | G06K 9/00201 |
| 2020/0090405 A1* | 3/2020 | Lagmanson | G06T 19/006 |
| 2020/0097501 A1* | 3/2020 | Matsubara | G06T 7/248 |
| 2020/0097645 A1* | 3/2020 | Tokie | G06F 16/538 |
| 2020/0104969 A1* | 4/2020 | Aratani | G06T 11/00 |
| 2020/0142924 A1* | 5/2020 | Suzuki | H04N 7/18 |
| 2020/0151448 A1* | 5/2020 | Lin | G06K 9/6256 |
| 2020/0175764 A1* | 6/2020 | Romea | G06T 19/006 |
| 2020/0234046 A1* | 7/2020 | Hiruta | H04N 21/47217 |
| 2020/0242782 A1* | 7/2020 | Moriya | G06K 9/6218 |
| 2020/0272654 A1* | 8/2020 | Yamazaki | G06K 9/00288 |
| 2020/0326540 A1* | 10/2020 | Sumigama | H04N 5/225 |
| 2020/0336607 A1* | 10/2020 | Kunieda | G06K 9/00993 |

FOREIGN PATENT DOCUMENTS

| | | |
|---|---|---|
| JP | 2008-078845 A | 4/2008 |
| JP | 2009017540 A | 1/2009 |
| JP | 2010-161562 A | 7/2010 |
| JP | 2011-35837 A | 2/2011 |
| JP | 2013-156784 A | 8/2013 |
| JP | 2015056152 A | 3/2015 |
| JP | 2015-142183 A | 8/2015 |
| WO | 2016/025691 A1 | 2/2016 |

OTHER PUBLICATIONS

Japanese Office Action dated Jul. 13, 2021 as recieved as application No. 2017-007862.

Japanese Office Action issued in corresponding application No. JP 2017-007862, dated Feb. 24, 2021.

* cited by examiner

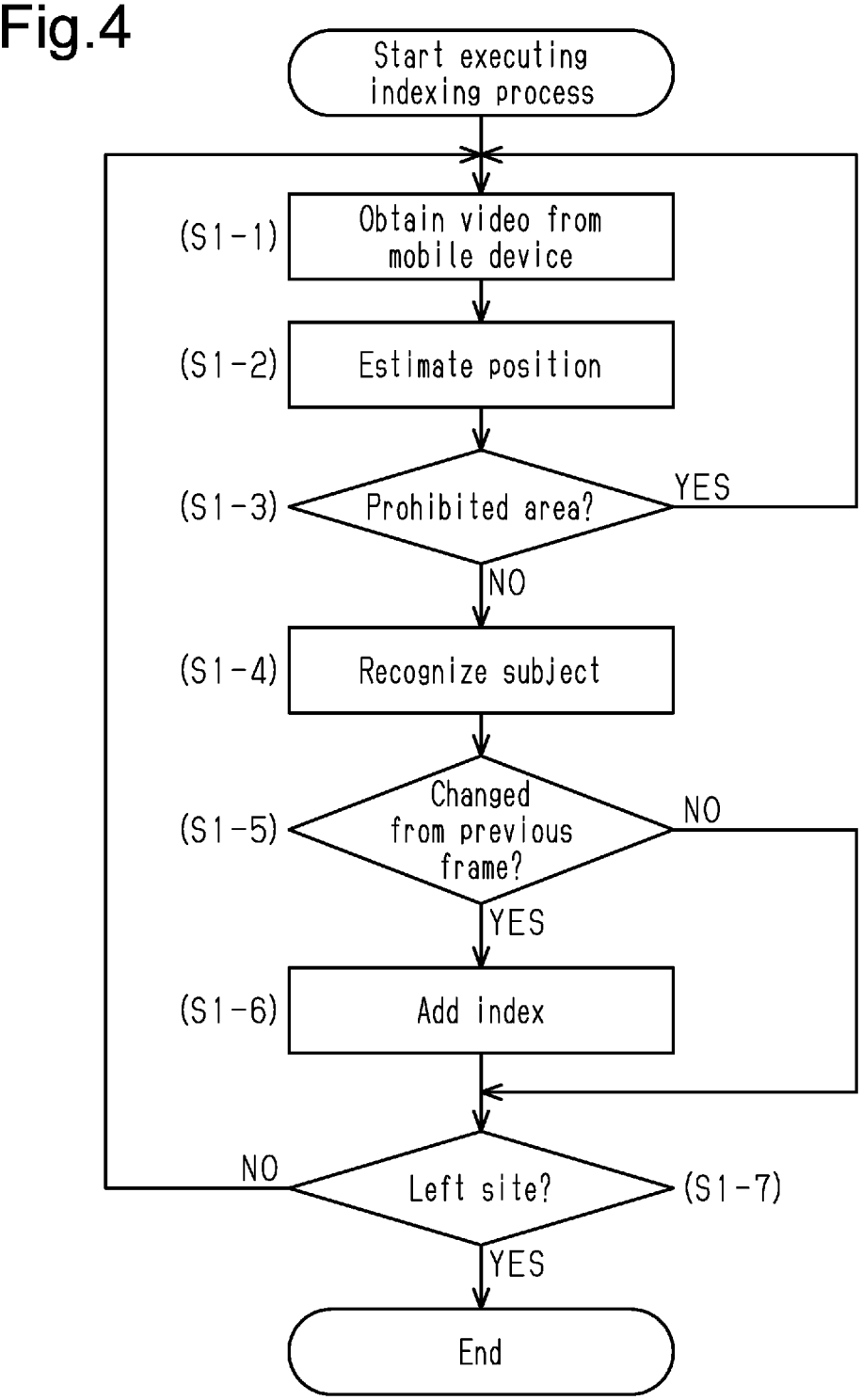

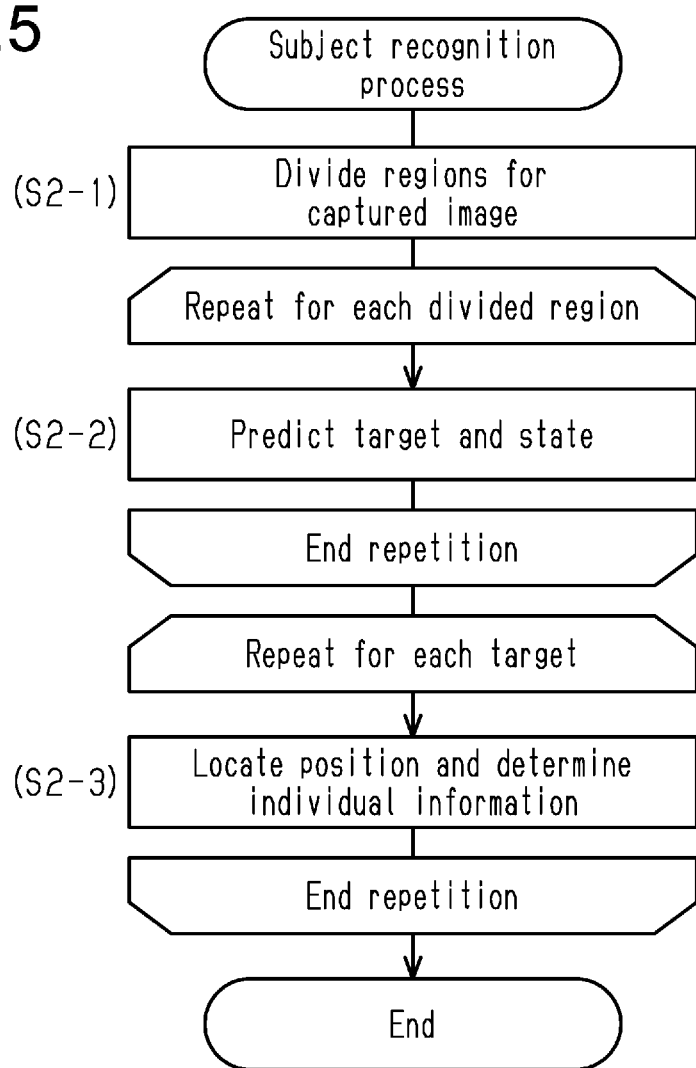

SYSTEM, METHOD, AND COMPUTER-READABLE MEDIUM FOR MANAGING IMAGE

BACKGROUND

1. Field

The following description relates to a system, a method, and a computer-readable medium for managing an image.

2. Description of Related Art

In some cases, a user wants to check past situations in a recorded video. In this case, the user needs to search the video for a desired scene.

Japanese Laid-Open Patent Publication No. 2011-35837 describes a technique for easily extracting only a scene that satisfies a predetermined condition in a video. In this technique, an indexing controller extracts the facial image of a person that appears in video content data and stores the extracted facial image in a database as index information together with timestamp information, classification information, and the like. A slideshow creating unit uses the index information to present one facial image per person as an option. Then, the slideshow creating unit uses the index information to extract a frame (image) in which a facial image having the same classification information as the classification information of the selected facial image has been extracted and stores the extracted image in a hard disk drive (HDD) as still image data. The slideshow creating unit sequentially displays the still image data stored in the HDD.

In the technique, an image to be stored is extracted based on the facial image of a predetermined person. However, when searching a captured image for the images of subjects having identical shape, such as certain building construction materials, it is difficult to determine whether the building construction materials are particular members. Additionally, when a member that should originally exist is not captured as a subject, this member cannot be used as index information.

SUMMARY

It is an objective of the present disclosure to provide a system, a method, and a computer-readable medium for managing an image by effectively determining an image that includes a desired subject.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a system for managing images is provided. The system includes circuitry configured to obtain an image that is captured by an image capture device at an image capture position and an image capture time, store the image, the image capture position, and the image capture time, determine a position of a subject included in the image based on the image capture position, store index information comprising a target identifier of the subject, the position of the subject, and the image capture time in association with the stored image, when obtaining a search instruction of the image, determine index information corresponding to the search instruction, and extract the image corresponding to the determined index information.

In another general aspect, a method for managing images using a system including circuitry is provided. The method includes storing, by the circuitry, an image captured by an image capture device, storing, by the circuitry, index information that is to be associated with the image, obtaining and storing, by the circuitry, the image, image capture position information of the image, and an image capture point in time of the image, determining, by the circuitry, a position of a subject included in the image using the image capture position information of the image, storing, by the circuitry, a target identifier of the subject, the position, and the image capture point in time in association with the stored image as the index information, when obtaining a search instruction of the image, determining, by the circuitry, the index information corresponding to the search instruction, and extracting, by the circuitry, the image corresponding to the determined index information.

In a further general aspect, a non-transitory computer-readable medium that stores instructions is provided. The instructions, when executed by a system including circuitry, causes the circuitry to store an image captured by an image capture device, store an image captured by an image capture device, store index information that is to be associated with the image, obtain and store the image, image capture position information of the image, and an image capture point in time of the image, determine a position of a subject included in the image using the image capture position information of the image, store a target identifier of the subject, the position, and the image capture point in time in association with the stored image as the index information, when obtaining a search instruction of the image, determine the index information corresponding to the search instruction, and extract the image corresponding to the determined index information.

Other features and aspects will be apparent from the following detailed description, the drawings, and the claims.

BRIEF DESCRIPTION OF THE DRAWINGS

FIG. 4 is a flowchart illustrating the procedure of an indexing process in the management system of FIG. 1.

FIG. 5 is a flowchart illustrating the procedure of a subject recognition process in the management system of FIG. 1.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described.

Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A system, a method, and a computer-readable medium for managing an image according to an embodiment will now be described with reference to FIGS. 1 to 7. In the present embodiment, a target to be managed is a video captured in a construction site.

Figure 1:
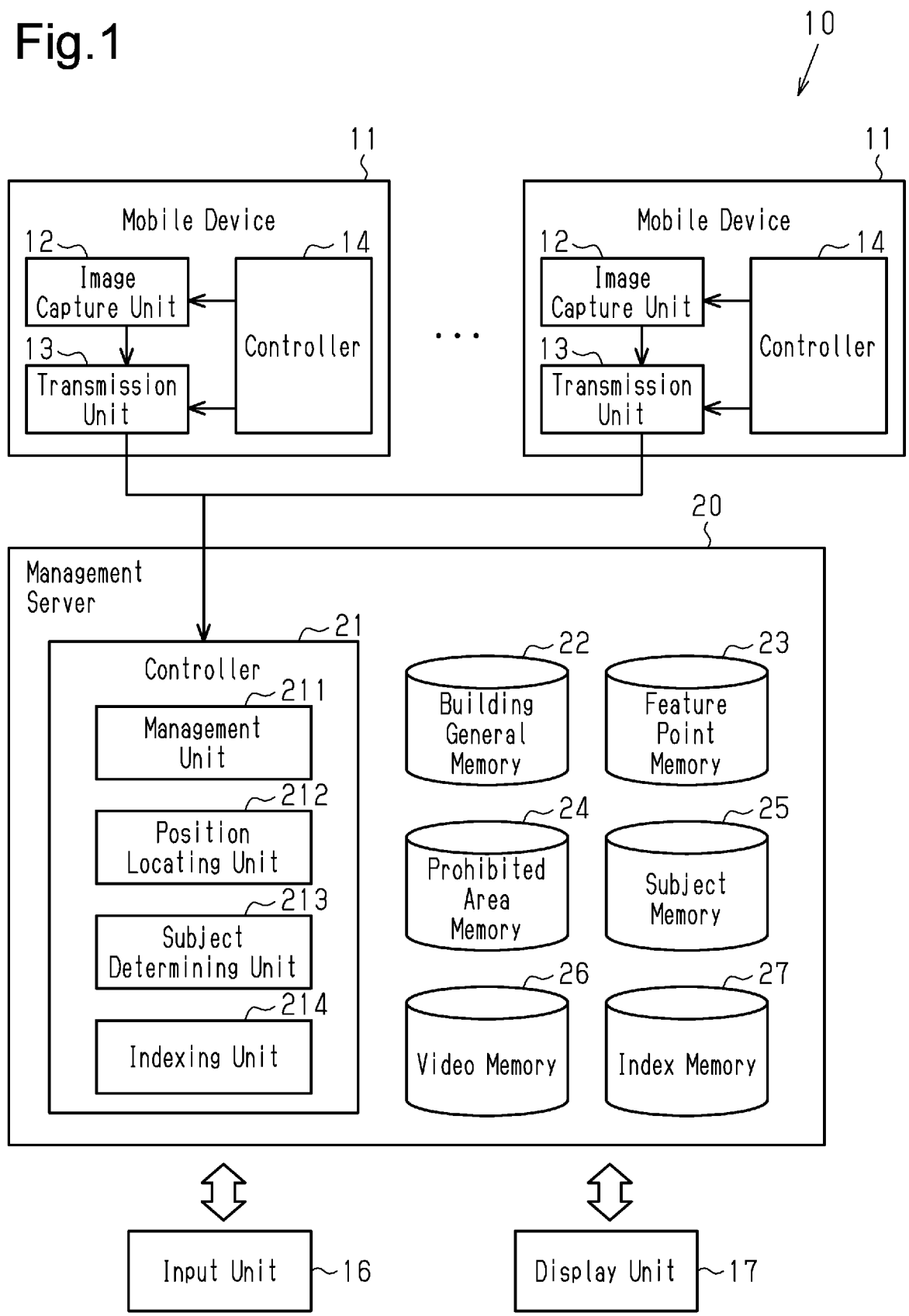
FIG. 1 is a diagram illustrating the entirety of a management system according to an embodiment.

As shown in FIG. 1, a management system 10 of the present embodiment includes a management server 20, which is connected to mobile devices 11.

Figure 2:
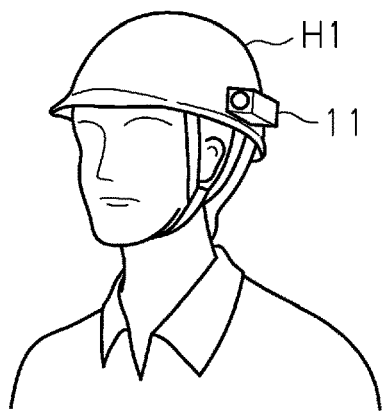
FIG. 2 is a perspective view illustrating a position at which the mobile device of FIG. 1 is attached.

As shown in FIG. 2, the mobile device 11 is a wearable terminal that serves as an image capture device. The mobile device 11 is attached to a side portion of a helmet H1, which is worn by a worker who is working while moving in a construction site.

As shown in FIG. 1, the mobile device 11 includes an image capture unit 12, a transmission unit 13, and a controller 14.

The image capture unit 12 is configured by, for example, a charge coupled device (CCD) camera. The image capture unit 12 generates a video (image) by capturing the view from the front side of the worker.

The transmission unit 13 transmits the video captured by the image capture unit 12 to the management server 20 per predetermined size.

The controller 14 controls starting and stopping of image capture by the image capture unit 12 and controls starting and stopping of transmission or the like by the transmission unit 13. The controller 14 holds image capture device identification information for determining the mobile device 11.

The management server 20 includes an input unit 16 and a display unit 17. The input unit 16 is a keyboard or a pointing device (e.g., a mouse). The display unit 17 is a display that displays, for example, the information of a video, which is a search result.

The management server 20 includes a controller 21, a building general memory 22, a feature point memory 23, a prohibited area memory 24, a subject memory 25, a video memory 26, and an index memory 27.

The controller 21 includes, for example, a CPU, a RAM, and a ROM and performs processes described later (the processes of, for example, a management stage, a position locating stage, and a subject determining stage). By executing the management program for executing the processes, the controller 21 serves as a management unit 211, a position locating unit 212, a subject determining unit 213, and an indexing unit 214.

The management unit 211 obtains a video captured y the mobile device 11 to manage this video.

The position locating unit 212 estimates an image capture position and an image capture direction based on the video to execute a process for determining an image capture view. In the present embodiment, the position locating unit 212 locates an image capture position using known visual simultaneous localization and mapping (v-SLAM).

The subject determining unit 213 executes a process for determining a target corresponding to a subject (thing) in the determined image capture view and a state of the subject. The subject determining unit 213 of the present embodiment uses a convolutional neural network of deep learning. More specifically, the subject determining unit 213 inputs images of divided regions in an image capture frame to a learned classification model generated through learning to determine a target to be managed and the state or material of the target. Because of this learning, the subject determining unit 213 stores the learned classification model, which has learned through the deep learning, in the subject memory 25 based on a known method using a vast amount of training data stored in the subject memory 25.

The indexing unit 214 executes an indexing process for assigning an index to an image obtained from the mobile device 11.

The building general memory 22 stores building general information related to a building under construction. In the present embodiment, building information modeling (BIM) data is used as the building general information. The building general information includes an object configuring a building, attribute information, and location information. An object includes a three-dimensional model to which an object ID is assigned. Attribute information includes information related to an object ID, an object name, and an object specification such as type, area, material properties, product information, and costs. Location information includes information related to the position (coordinates) where the object is arranged.

An object ID is an identifier that identifies an object.

An object name refers to the name of the object.

Type, area, material properties, product information, and costs refer to the type (structure type or fixture type), area, material properties, product information, and costs of an object.

Location information refers to data related to an identifier that identifies the place (construction area) where the object is arranged. A construction area is a group where dwelling units (rooms) of a building are integrated in terms of space (adjacent dwelling units) and time (working time) in order to gradually proceed with construction of the building. A construction area is set for, for example, the dwelling units on a floor or part of a floor of a building.

The feature point memory 23 stores information related to a feature point in a construction site used to locate the position (image capture position) of the mobile device 11. The feature point information is related to the feature of an image when captured from the inside of a building under construction. The feature point information includes a feature point identifier, the feature amount of an image that determines the feature point, and the position of the feature point (xyz-coordinates, i.e., three-dimensional coordinates).

The prohibited area memory 24 stores prohibited area information for determining an image capture prohibited area. The prohibited area information is registered in advance before execution of a management process, which will be described later. The prohibited area information includes data related to a prohibited area information identifier, area name, and position (coordinates) of the prohibited area. The image capture prohibited area is, for example, a bathroom used by a worker.

The subject memory 25 stores information used to determine a subject or determine the state of a subject. The information is registered in advance before execution of the management process, which will be described later.

Figure 3A:
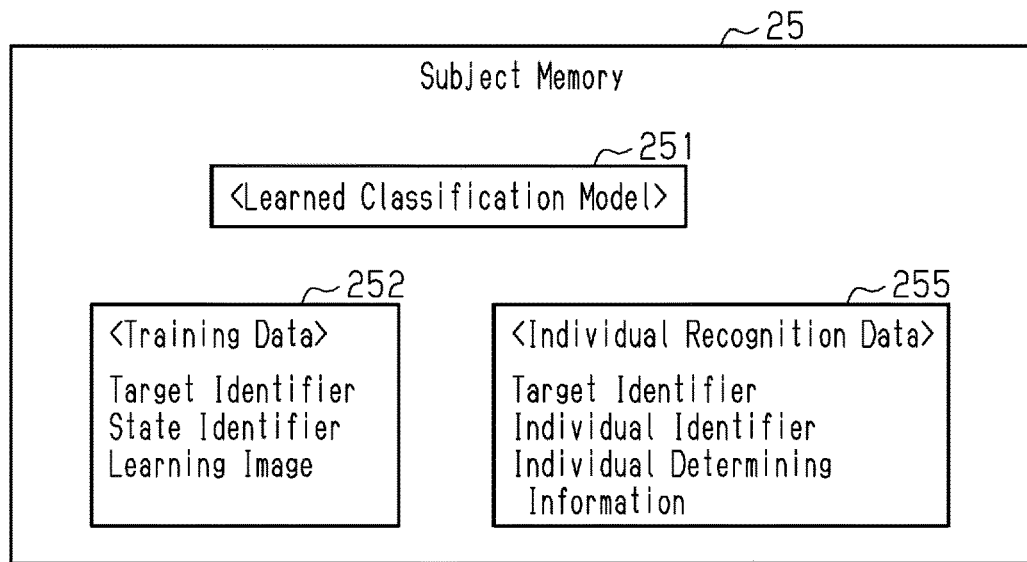
FIG. 3A is a diagram illustrating information stored in the subject memory of the management system shown in FIG. 1.

More specifically, as shown in FIG. 3A, the subject memory 25 stores a learned classification model 251, training data 252, and individual recognition data 255.

The learned classification model 251 is generated through deep learning that determines a target to be managed and the state of the target using the training data 252. The learned classification model 251 is associated with a target identifier and a state identifier.

A target identifier data region records data related to an identifier (a name in this case) that determines the type of a thing. The type of a thing is a construction element (for example, construction material or finishing) and a material used for construction, an apparatus used in a construction site (for example, welder or pump), or the like.

A state identifier data region records an identifier that determines the state of a subject determined by a target identifier. For example, when the subject is a welder, an identifier indicating whether the welder is being used is recorded.

The training data 252 is used to calculate a learned classification model of deep learning. The training data 252 includes data related to a target identifier and a state identifier, which are used as output layers, and a learning image, which is used as an input layer.

The target identifier data region and the state identifier data region respectively record data related to an identifier that determines the type of a target (thing) to be managed and data related to an identifier that determines the state of the target.

The individual recognition data 255 is used to recognize an individual such that the subject is distinguished from similar things (construction elements or apparatuses). The individual recognition data 255 includes data related to a target identifier, an individual identifier, and individual determining information.

The target identifier data region records data related to an identifier that determines the type of the target (for example, welder or pump).

An individual identifier data region records data related to an identifier that individually determines a target.

An individual determining information data region records information for distinguishing the target of an image from other similar individuals. The individual determining information is related to, for example, the color of a color marker assigned to the target or the position of the target.

Figure 3B:
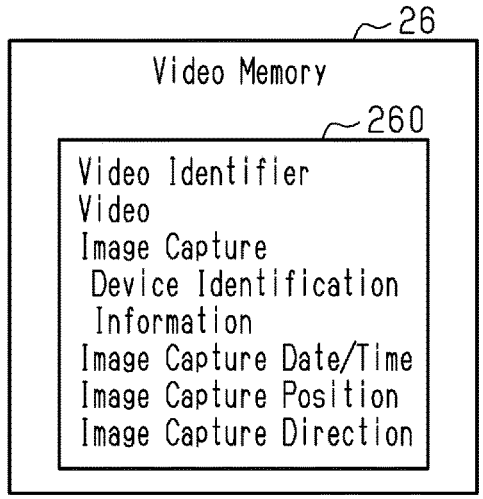
FIG. 3B is a diagram illustrating information stored in the video memory of the management system shown in FIG. 1.

As shown in FIG. 3B, the video memory 26 stores video management information 260, which is related to a video captured by the mobile device 11. The video management information 260 includes data related to a video identifier, video, image capture device identification information, image capture date/time, image capture position, and image capture direction.

A video identifier data region records data related to an identifier that determines a video.

A video data region records a video captured by the mobile device 11.

An image capture device identification information data region, an image capture date/time data region, an image capture position data region, and an image capture direction data region respectively record data related to the device that captured the video (mobile device 11), data related to a date/time on which the video was captured, data related to a position at which the video was captured, and data related to a direction in which the video was captured.

Figure 3C:
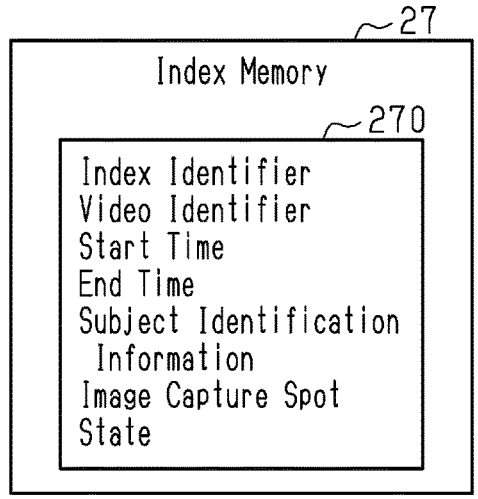
FIG. 3C is a diagram illustrating information stored in the index memory of the management system shown in FIG. 1.

As shown in FIG. 3C, the index memory 27 stores index information 270 used to search for an image. The index information 270 is recorded when the indexing process (described later) is executed. The index information 270 includes data related to an index identifier, a video identifier, a start time, an end time, subject identification information, an image capture spot, and a state.

An index identifier data region records data related to an identifier that identifies an index for searching for a particular image.

A video identifier data region records data related to an identifier that identifies a video captured in the construction site. The video identifier is used to associate the video management information 260 with the index information 270.

A start time data region records data related to the start time of a period in which the index is assigned in the video, and an end time data region records data related to the end time of a period in which the index is assigned in the video.

A subject identification information data region records data related to an identifier that identifies a subject included in the image to which the index is assigned. A target identifier and subject identification information (for example, object ID or individual identifier) are recorded as subject identification information.

An image capture spot data region records data related to the position of the construction site where the video was captured. In the present embodiment, the data is related to the image capture spot (image capture position) of a frame corresponding to the start time of the index information 270.

A state data region records data related to the state of the subject.

Indexing Process

The indexing process using the management system 10 will now be described with reference to FIG. 4.

When a worker starts working in a construction site, the worker activates the mobile device 11, which is attached to the helmet H1. In this case, the controller 14 of the mobile device 11 starts capturing a video by the image capture unit 12 and records the captured video in a memory. The memory records the video identifier and the image capture date/time in association with the video. Then, the controller 14 transmits the video recorded in the memory and the image capture device identification information to the management server 20 via the transmission unit 13 per predetermined size.

The controller 21 of the management server 20 executes a process for obtaining a video from the mobile device 11 (step S1-1). More specifically, the management unit 211 of the controller 21 receives a video having a predetermined size and the image capture device identification information from the mobile device 11. Then, the management unit 211 generates the video management information 260, which includes the received video, video identifier, image capture date/time, and image capture device identification information, and stores the video management information 260 in the video memory 26.

Next, the controller 21 executes a position estimation process (step S1-2). More specifically, the position locating unit 212 of the controller 21 determines, as a candidate feature point, a feature point that is likely to be shown in the current frame among feature points used to locate the most recent position. The position locating unit 212 uses multiple pieces of frame information to predict the movement direction and amount of the worker and determine the candidate feature point based on the predicted movement direction and amount. The position locating unit 212 searches for a feature point that matches the feature amount of the candidate feature point in the current frame (image). When determining the matching feature point, the position locating unit 212 uses the position of the determined feature point (xyz-coordinates) to locate the image capture position and the image capture angle and records the position and angle in the video management information 260. The position locating unit 212 determines the image capture range (image capture view) from the image capture position and angle and from the image.

Subsequently, the controller 21 executes a process for determining whether the image capture position is located in the image capture prohibited area (step S1-3). More specifically, the management unit 211 determines whether the image capture area is included in the prohibited area by comparing the estimated image capture position with the position (coordinates) of the prohibited area information of the prohibited area memory 24.

When determining that the image capture position is located in the image capture prohibited area ("YES" in step S1-3), the controller 21 deletes the video obtained from the mobile device 11. Then, the controller 21 waits for receipt of the next video.

When determining that the image capture position is located out of the image capture prohibited area ("NO" in step S1-3), the controller 21 executes a subject recognition process (step S1-4). The subject determining unit 213 of the controller 21 determines the subject identification information (target identifier or individual identifier, which is object ID or individual identifier of subject) of a subject (thing) included in the frame, the position of the subject, or the like. The detail of the subject recognition process will be described below.

Subsequently, the controller 21 determines whether there have been changes from the previous frame (step S1-5). More specifically, the indexing unit 214 determines that there have been changes from the previous frame when the subject identification information associated with the previous frame stored in the memory does not correspond to the subject identification information associated with the current frame. The indexing unit 214 determines that there have been changes from the previous frame in a case in which the current frame is an initial frame when work begins in a construction site, that is, in a case in which the previous frame does not exist.

When determining that there have been changes from the previous frame ("YES" in step S1-5), the controller 21 executes a process for adding an index (step S1-6). More specifically, when determining that a subject (thing) that has not been detected in the previous frame is detected, the indexing unit 214 assigns a new index identifier, generates index information 270 including this index identifier, and records the index information 270 in the index memory 27. The index information 270 includes a video identifier of the current frame and includes the start time and the image capture position of this image. Further, the indexing unit 214 records, in the index information 270, the subject identification information, the state of the subject, and the like determined in step S1-4. When the current frame is an initial frame, index information 270 is generated for every subject (thing) that has been newly detected.

When determining that the subject detected in the previous frame has disappeared, the indexing unit 214 records, in the index information 270 associated with the previous frame, the image capture date/time of the previous frame as an end time. When the image capture ends, the indexing unit 214 records the end time in all the pieces of index information 270.

Figure 6A:
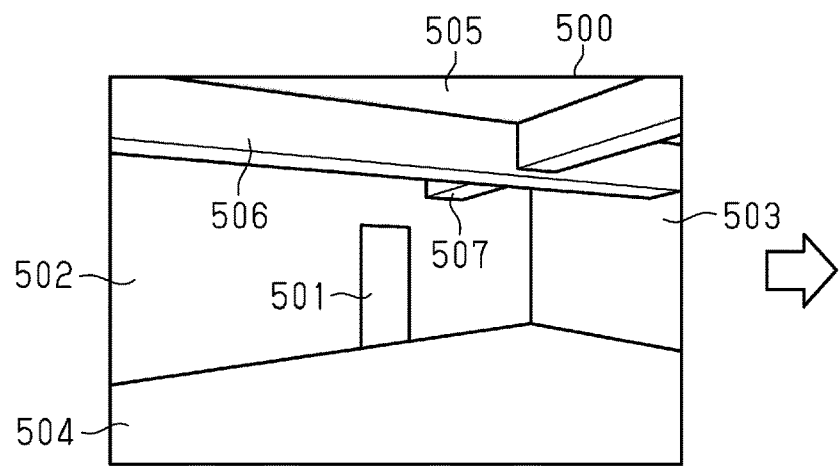
FIGS. 6A and 6B are diagrams illustrating the image captured in the management system of FIG. 1, in which the image capture position in FIG. 6B is located on the right side of the image capture position in FIG. 6A.
Figure 6B:
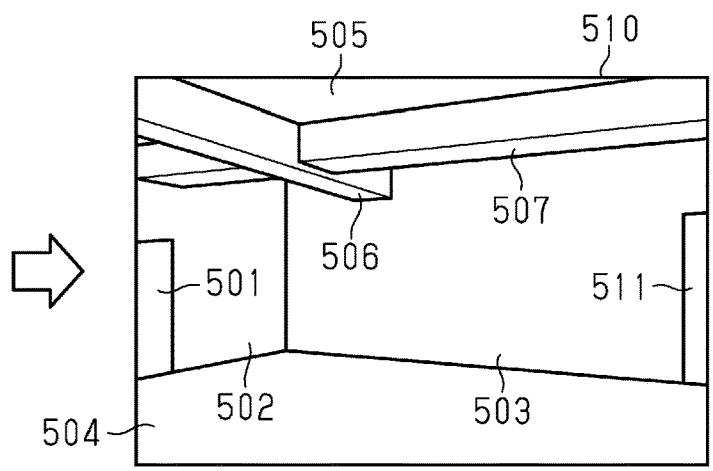

For example, an exemplary image 500 shown in FIG. 6A is captured and then an exemplary image 510 shown in FIG. 6B is captured with the camera rotated to the right side. The image 500 includes, as a subject, a fitting 501, walls 502 and 503, a floor 504, a ceiling 505, and beams 506 and 507. It is assumed that a fitting 511 has been determined as a subject in addition to the subjects (things) determined in the image 500. In this case, index information 270 of the fitting 511, which has not been recognized as a subject in the image 500, is newly recorded in association with the image capture date/time of the image 510.

When the indexing unit 214 determines that there have been no changes from the previous frame ("NO" in step S1-5), the controller 21 skips the process of step S1-6.

The controller 21 executes a process for determining whether the worker has left the site (step S1-7). When the worker leaves the site, the mobile device 11 receives a leaving input. In this case, the controller 14 of the mobile device 11 determines that the worker has left the site and transmits leaving information to the management server 20. When the controller 21 does not receive the leaving information and determines that the worker has not left the site ("NO" in step S1-7), the controller 21 continues the processes subsequent to step S1-1.

When receiving the leaving information and determines that the worker has left the site ("YES" in step S1-7), the management unit 211 ends the management process.

Subject Recognition Process

The above-described subject recognition process (step S1-4) will now be described with reference to FIG. 5.

First, the controller 21 executes a region division process for a captured image (step S2-1). More specifically, the subject determining unit 213 uses a known method to divide multiple regions included in each frame (image) of a captured video. The subject determining unit 213 divides the regions using, for example, the edges included in the captured image or the hue information and saturation information of a pixel.

The controller 21 sequentially determines each divided region as a target to be processed and repeats the next process.

The controller 21 executes a process for predicting a target and a state (step S2-2). More specifically, the subject determining unit 213 sets the image of each divided region as an input value and determines the target and state or the material using the learned classification model 251, which is stored in the subject memory 25. In a case in which the target and state of, for example, a pillar, a wall, or a floor cannot be determined but the material thereof can be determined through deep learning, the material is determined.

Then, the controller 21 sequentially determines each subject (each target) as a target to be processed and repeats the following processes.

First, the controller 21 executes a process for locating the position and determining individual information (step S2-3). More specifically, the subject determining unit 213 uses the image capture position and the image capture direction to locate the position of the subject of the image and store the position in the memory of the controller 21. The subject determining unit 213 executes a process for determining whether the building general memory 22 stores an object corresponding to the target identifier of the subject at the position of the subject. When the corresponding object is stored, the object ID of the object is determined and stored in the memory of the controller 21.

When the corresponding object is not stored in the building general memory 22, the subject determining unit 213 searches the image of the subject for an image part corresponding to individual determining information. When the image part includes the individual determining information, the subject determining unit 213 determines the individual identifier of the individual recognition data 255, where the individual determining information is recorded, and stores the individual identifier in the memory of the controller 21.

The image 500 is obtained and shown in FIG. 6A. In this case, the controller 21 generates multiple divided regions based on the contour of the image. The controller 21 performs deep learning to determine the target and state of the image in each divided region or determines the material of an object in the region. In addition, the controller 21 uses the material of the object, the position determined using the image capture position of the image, and the image capture direction of the image, and the object recorded in the building general memory 22 to determine the fitting 501, the walls 502 and 503, the floor 504, the ceiling 505, and the beams 506 and 507. When obtaining the image 510 shown in FIG. 6B, the controller 21 determines the fittings 501 and 511, the walls 502 and 503, the floor 504, the ceiling 505, and the beams 506 and 507 in the same manner.

Image Search Process

Figure 7:
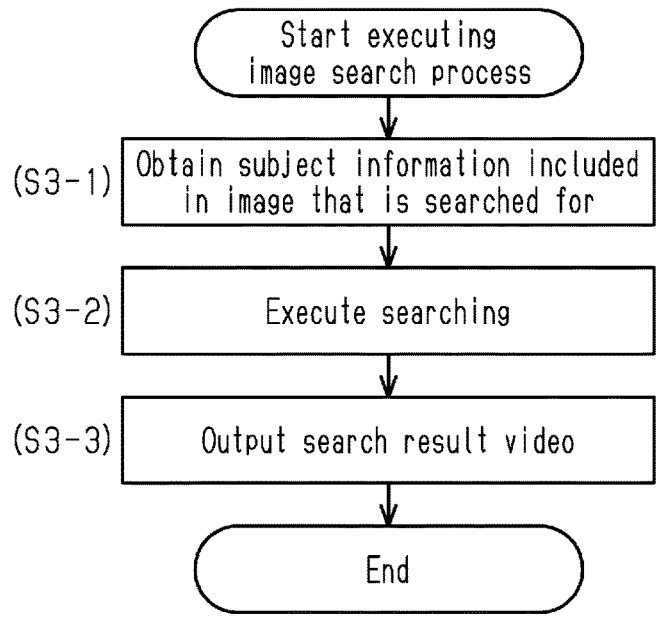
FIG. 7 is a flowchart illustrating the procedure of an image search process in the management system of FIG. 1.

The process for searching for an image will now be described with reference to FIG. 7. For example, it is assumed that after a building that has been under construction is completed, an image from during the construction of the building at a particular spot (e.g., particular area) is searched for.

First, the controller 21 executes a process for obtaining subject information included in an image to be searched for (step S3-1). More specifically, the management unit 211 displays a search screen on the display of the display unit 17. The search screen includes an entry field, where the subject information to be searched for is input, and includes a search execution button. The subject information includes the position of a subject, the subject identification information (target identifier, object ID, or individual identifier), the state of a subject, and time (image capture timing). For example, the worker uses the input unit 16 to input, on the entry field of the search screen, the subject identification information and the information related to the image capture spot and the image capture timing and select the search execution button.

The controller 21 executes a search execution process (step S3-2). More specifically, when the obtained subject identification information is an object ID or an individual identifier, the management unit 211 searches the index memory 27 for index information 270 including an object ID or an individual identifier corresponding to the obtained subject identification information. Further, when the obtained subject identification information and the image capture spot are obtained, the management unit 211 searches the index memory 27 for the index information 270 including the subject identification information and the image capture spot.

When the corresponding index information 270 is extracted, the management unit 211 determines, in the video memory 26, a video identified by the video identifier of the extracted index information 270. The management unit 211 extracts, from the determined video, an image (search result video) corresponding to the start time and the end time of the index information 270.

The controller 21 executes a process for outputting the search result video (step S3-3). More specifically, the management unit 211 displays the extracted search result video on the display of the display unit 17.

The present embodiment has the following advantages.

(1) The controller 21 includes identification information, which includes subject identification information, an image capture spot, and an image capture time. This allows the controller 21 to use index information to effectively determine and output an image including a desired subject. In this case, the controller 21 can use the image capture spot, the image capture point in time, and the like to search for the image.

(2) In the process for determining the position and individual information of a subject (step S2-3), the controller 21 determines an object ID recorded in the building general memory 22 from the target identifier and the position of the subject. In the process for adding an index (step S1-6), the controller 21 records the determined object ID as the subject identification information of index information 270. This allows the controller 21 to effectively determine an image including a desired subject from the object ID.

(3) The controller 21 incorporates the state of a determined subject into index information 270. This allows the controller 21 to effectively determine an image including the corresponding subject from the state of the subject.

(4) When determining that there have been changes from the previous frame ("YES" in step S1-5), the controller 21 executes the process for adding an index (step S1-6). Thus, when there have been changes in the state of a subject, the controller 21 adds new index information and thus can effectively associate, with the image, the index information of the identification information or the like of the subject.

The above-described embodiment may be modified as follows.

In the above-described embodiment, the controller 21 uses v-SLAM to locate an image capture position and angle. Instead, an image capture position and angle may be located using, for example, pedestrian dead reckoning (PDR). In this case, the mobile device 11 is provided with, for example, an acceleration sensor and a gyro sensor. The acceleration sensor detects, in three axes, acceleration information (for example, direction and magnitude of acceleration) of acceleration applied to the mobile device 11. The gyro sensor detects, in the three axes, angular velocity information (for example, direction and magnitude of angular velocity) of angular velocity applied to the mobile device 11, The transmission unit 13 transmits the detection values of the acceleration sensor and the gyro sensor when capturing an image and transmits the detection values and the image to the management server 20. Instead of individual acceleration sensors and gyro sensors, an inertial measurement unit (IMU) that includes those sensors and optionally other sensors may be used. Also, the IMU may be used with the v-SLAM. In this case, more robust position estimation is enabled by using information from the IMU in addition to the information from the image obtained with the v-SLAM.

In the above-described embodiment, the controller 21 executes the position estimation process (step S1-2) and the process for determining the image capture prohibited area (step S1-3). These processes may be executed by the mobile device 11. In this case, when the controller 14 of the mobile device 11 determines that the image capture position is located in the image capture prohibited area, image capture may be stopped. More specifically, when the controller 14 determines that the image capture position is located in the image capture prohibited area, image capture is suspended for a predetermined period of time.

Alternatively, a warning may be output to indicate that the image capture position is located in the image capture prohibited area. When the warning goes off, the worker stops capturing an image.

When the controller 14 determines that the worker has left the image capture prohibited area in the position estimation process, the controller 14 resumes capturing of an image and transmission of an image to the management server 20.

As another option, the mobile device 11 may be provided with a cover (for example, lens cover) that opens and closes an opening of the image capture device, from which light is taken in. When the controller 14 determines that the worker has arrived at the image capture prohibited area, the controller 14 controls the cover to move to close the opening.

In the above-described embodiment, a subject (target to be managed) is a movable apparatus used in a construction site such as a welder or a pump. Instead, a subject may be a building material such as an aerial work platform or a scaffold. Additionally, a target is not limited to a thing and may be a person. In addition, situations such as the progress of the construction and the process may be determined based on the target and the state of the target that are determined based on the images. In this case, the controller 21 determines the situation based on data about the association between the process of the construction and the target.

In the above-described embodiment, the controller 21 determines the video identifier of the index information 270 including the subject identification information of subject information to be searched for and outputs the video corresponding to the video identifier. In addition, an image that does not show a subject that should be shown in the image, an image showing a subject that should not be shown in the image, and the like may be output. More specifically, the controller 21 executes a subject prediction process prior to the subject recognition process (step S1-4). In the subject prediction process, the controller 21 uses building general information recorded in the building general memory 22 to determine, in accordance with the progress of the current construction, the object ID of a member predicted to be visually recognizable in the image capture range (image capture view) determined in step S1-2. The controller 21 compares the object ID determined in the subject prediction process with the object ID of the subject determined in the subject recognition process (step S1-4). The controller 21 displays an alert notification on the display unit 17 when detecting an object ID that differs from the object ID determined in the subject prediction process and the object ID of the subject determined in the subject recognition process.

In addition, the object ID that differs from the object ID determined in the subject prediction process may be recorded in the index information 270 as a non-matching identifier. In this case, when a non-matching identifier is input in the entry field of the search screen, the controller 21 determines the video corresponding to the index information 270 that includes the non-matching identifier. Thus, an image that originally includes a subject that differs from the predicted subject can be extracted.

In the above-described embodiment, the controller 21 executes the process for obtaining subject information included in an image to be searched for, the search execution process, and the process for outputting the search result video. Instead, for example, the index information 270 may be used to extract an image in which a particular space (range) such as one room of an apartment is captured. In this case, the controller 21 uses the building general memory 22 to determine the object ID of a member that configures the particular space as the subject information included in the image to be searched for. Then, the controller 21 extracts index information 270 in which this space is set as an image capture spot and index information 270 that includes the determined object ID as the subject identification information.

Further, the controller 21 outputs the video corresponding to the video identifier included in these pieces of index information 270. This allows the controller 21 to effectively extract the video including the subject related to the space.

In the above-described embodiment, the controller 21 records data related to the position of an image capture site as an image capture spot of the index information 270. The image capture spot included in the index information 270 may be the position of the subject determined in the image. Information for determining the image capture range may also be used. Thus, even when the individual information (object ID) of a subject cannot be determined, the controller 21 can determine an image including the subject corresponding to a place using the position and the image capture range of the subject together with the target identifier of the subject.

In the above-described embodiment, the controller 21 uses an image to determine a usage state in the process for predicting a target and a state (step S2-2). However, a usage state does not have to be determined using an image. For example, the state of a subject may be determined using information by which an image is accompanied, such as sound included in a video. In this case, the controller 21 uses deep learning to determine the sound generated when the target is used. In this case, the frequency characteristics of the generated sound are used to learn the state of the target.

In the subject recognition process of the above-described embodiment, the subject determining unit 213 executes the region division process for a captured image (step S2-1) and executes the process for predicting a target and a state for each divided region (step S2-2). Instead, the process for predicting a target and a state may be executed through region extraction by detecting an object.

The process for predicting a target and a state is executed using deep learning. Instead, the process for predicting a target and a state may be executed using, for example, known scale-invariant feature transform (SIFT) as long as the target and the state can be determined using an image.

In the above-described embodiment, the controller 21 locates an image capture position from an image. The image capture position information for locating the position at which an image has been captured is not limited to image information. Instead, the image capture position information may be, for example, information obtained from a global positioning system (GPS).

In the above-described embodiment, image capture is performed by the image capture unit 12 of the mobile device 11, which is attached to the helmet H1 for a worker. The image capture device for capturing the image of a target to be searched for is not limited to a mobile image capture device and may be a fixed image capture device.

In the above-described embodiment, the controller 21 searches for a captured video. The image of a search target is not limited to a video and may be a still image captured in a predetermined time interval. In addition, the mobile device 11 transmits the video captured by the image capture unit 12 to the management server 20 per predetermined size. Alternatively, the mobile device 11 may transmit the captured video to the management server 20 collectively, for example, after the worker has left the site. Furthermore, the mobile device 11 may transmit the video to the management server 20 by streaming.

In the above-described embodiment, the subject of a target to be managed is extracted in a video in which a construction site is captured. The video to be captured is not limited to a construction site and may be, for example, a video captured by a surveillance camera. A subject is extracted using the target identifier of a subject, the position of the subject, and the image capture point in time of the subject as index information. In this case, an image including a subject (face) can be extracted by doing facial recognition.

Additionally, a facial authentication process may be performed to determine whether the face determined by the facial authentication is a known person. In this case, the facial image information of the known person is registered. Further, the facial image information determined by the facial recognition and the registered facial image information of the known person are used to distinguish the known person from an unknown person. This allows for extraction of an image including an unknown person who cannot be facially authenticated (i.e., a person whose facial image is not registered).

The controller 14 or 21 is not limited to one that performs software processing on all processes executed by itself. For example, the controller 14 or 21 may include a dedicated hardware circuit (for example, application specific integrated circuit: ASIC) that executes hardware processing on at least part of the processes executed by itself. That is, the controller 14 or 21 may be circuitry including: 1) one or more processors that operate according to a computer program (software); 2) one or more dedicated hardware circuits that execute at least part of various processes, or 3) a combination thereof. The processor includes a CPU and memories such as a RAM and a ROM. The memories store program codes or instructions configured to cause the CPU to execute processes. The memories, or computer readable media, include any type of media that are accessible by general-purpose computers and dedicated computers.

Various changes in form and details may be made to the examples above without departing from the spirit and scope of the claims and their equivalents. The examples are for the sake of description only, and not for purposes of limitation. Descriptions of features in each example e to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A system for managing images, the system comprising circuitry configured to:
   obtain an image that is captured by an image capture device at an image capture position and an image capture time;
   store the image, the image capture position, and the image capture time;
   determine a position of a subject included in the image based on the image capture position;
   predict a predicted subject included in the image based on the image capture position;
   store index information comprising a target identifier of the subject, the position of the subject, and the image capture time in association with the stored image;
   when obtaining a search instruction of the image, determine index information corresponding to the search instruction; and
   extract the image corresponding to the determined index information, wherein the index information includes the predicted subject is different from the subject included in the image.

2. The system according to claim 1, wherein
   the images includes a first image captured at a first image capture time and a second image captured at a second image capture time that is after the first image capture time, and
   the circuitry is further configured to add new index information for the second image capture time if a subject included in the second image has changed from a subject included in the first image.

3. The system according to claim 1, wherein the index information comprises a state of the subject, the circuitry is further configured to:
   determine the state of the subject based on the image.

4. A method for managing images using a system including circuitry, the method comprising:
   storing, by the circuitry, an image captured by an image capture device;
   storing, by the circuitry, index information that is to be associated with the image;
   obtaining and storing, by the circuitry, the image, image capture position information of the image, and an image capture point in time of the image;
   determining, by the circuitry, a position of a subject included in the image using the image capture position information of the image;
   predicting a predicted subject included in the image based on the image capture position;
   storing, by the circuitry, a target identifier of the subject, the position, and the image capture point in time in association with the stored image as the index information;
   when obtaining a search instruction of the image, determining, by the circuitry, the index information corresponding to the search instruction; and
   extracting, by the circuitry, the image corresponding to the determined index information, wherein the index information includes the predicted subject is different from the subject included in the image.

5. The method according to claim 4, wherein the images includes a first image captured at a first image capture time and a second image captured at a second image capture time that is after the first image capture time, the method further comprising:
   adding, by the circuitry, new index information for the second image capture time if a subject included in the second image has changed from a subject included in the first image.

6. The method according to claim 4, wherein the index information comprises a state of the subject, the method further comprising:
   determining, by the circuitry, the state of the subject based on the image.

7. A non-transitory computer-readable medium that stores instructions, wherein the instructions, when executed by a system comprising circuitry, causes the circuitry to:
   store an image captured by an image capture device;
   store index information that is to be associated with the image;
   obtain and store the image, image capture position information of the image, and an image capture point in time of the image;

determine a position of a subject included in the image using the image capture position information of the image;
predict a predicted subject included in the image based on the image capture position;
store a target identifier of the subject, the position, and the image capture point in time in association with the stored image as the index information;
when obtaining a search instruction of the image, determine the index information corresponding to the search instruction; and
extract the image corresponding to the determined index information, wherein the index information includes the predicted subject is different from the subject included in the image.

8. The non-transitory computer-readable medium according to claim 7, wherein the images includes a first image captured at a first image capture time and a second image captured at a second image capture time that is after the first image capture time, and the instructions further cause the circuitry to:
add new index information for the second image capture time if a subject included in the second image has changed from a subject included in the first image.

9. The non-transitory computer-readable medium according to claim 7, wherein the index information comprises a state of the subject, and the instructions further cause the circuitry to:
determine the state of the subject based on the image.

10. The system according to claim 1, wherein the index information comprises a state of the subject, the image is a video including sound, the circuitry is further configured to:
determine the state of the subject based on the sound included in the video.

11. The method according to claim 4, wherein the index information comprises a state of the subject, and the image is a video including sound, the method further comprising:
determining, by the circuitry, the state of the subject based on the sound included in the video.

12. The non-transitory computer-readable medium according to claim 7, wherein the index information comprises a state of the subject, the image is a video including sound, and the instructions further cause the circuitry to:
determine the state of the subject based on the sound included in the video.

13. The system according to claim 1, wherein the circuitry is further configured to:
store building general information related to a building that is under construction; and
determine an image capture range based on the image capture position information of the image, wherein predicting a subject included in the image includes predicting the subject included in the image based on the image capture range and the building general information.

14. The method according to claim 4, further comprising:
storing building general information related to a building that is under construction; and
determining an image capture range based on the image capture position information of the image, wherein predicting a subject included in the image includes predicting the subject included in the image based on the image capture range and the building general information.

15. The non-transitory computer-readable medium according to claim 7, wherein the circuitry is further caused to:
store building general information related to a building that is under construction; and
determine an image capture range based on the image capture position information of the image, wherein predicting a subject included in the image includes predicting the subject included in the image based on the image capture range and the building general information.

* * * * *